UNITED STATES PATENT OFFICE.

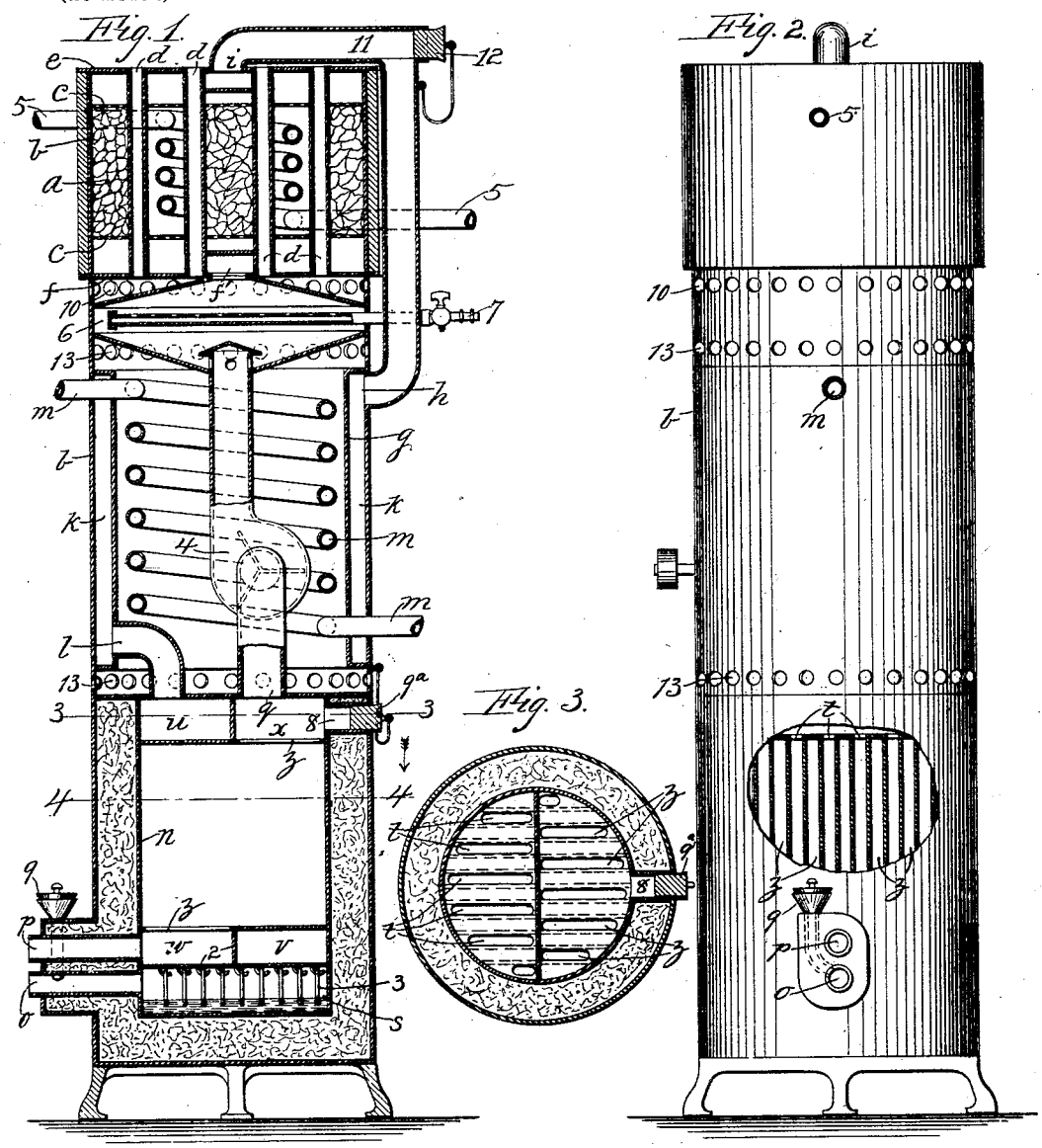
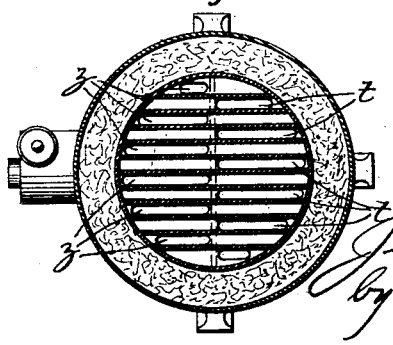

JEAN V. SKOGLUND, OF BAYONNE, NEW JERSEY.

REFRIGERATING APPARATUS.

SPECIFICATION forming part of Letters Patent No. 710,623, dated October 7, 1902.

Application filed September 26, 1900. Serial No. 31,157. (No model.)

*To all whom it may concern:*

Be it known that I, JEAN V. SKOGLUND, a subject of the King of Sweden and Norway, and a resident of Bayonne, Hudson county, and State of New Jersey, have invented certain new and useful Improvements in Refrigerating Apparatus, of which the following is a specification.

The object of this invention is to obtain refrigeration in a cheap and simple way without complicated machinery.

Dry air or air free from moisture or partly so absorbs water whenever the conditions permit. The maximum tension of such water vapors at a given temperature is a constant, according to the natural laws of physics. Whenever air absorbs water from a liquid or solid body containing it, heat is absorbed, which amount of heat just corresponds to the latent heat of steam at the prevailing temperature. I make use of these facts in constructing an apparatus for producing cold air.

The principle of working the apparatus is as follows: Air is dried or freed from part of its moisture by passing it over a substance capable of absorbing water, and after having been so dried it is then cooled to a certain temperature. It is then passed through a chamber, where it has an ample opportunity to be saturated or partly saturated with moisture, and thus also absorb heat and produce cold. The air is consequently cooled to a temperature depending upon its original temperature previous to entering the chamber containing water. The air so cooled may be used for any purpose of refrigeration—for instance, either for cold storage or for cooling water or other liquids. At the same time the air is cooled the water in the water-absorbing part is gradually cooled to the same temperature. As the cold spent air issuing from a cold storage or from any other place where it has been used is usually much colder than the surrounding atmosphere, it is used for cooling the dried air. Further, as this spent air usually contains less moisture than the surrounding atmosphere it is dried over again and continued in the circulation in preference to atmospheric air. The water for evaporation may be supplied in any way. It may be evaporated from a salt solution, or even water of crystallization may be used—for instance, crystals of Glauber's salt, which contain about fifty per cent. of water. Ice may be used. When the air passes over a drying material, such as calcium chlorid or sulfuric acid, it is freed from germs and microbes, which make it especially adapted for preservation of food.

Having now in general described my invention, I will proceed to the different parts of the apparatus which I have in this case chosen as an example for illustration of the invention, the same being represented in the accompanying drawings, in which—

Figure 1 is a vertical section of the apparatus for drying and cooling the air. Fig. 2 is a side elevation with a part of the casing broken out. Fig. 3 is a transverse section on line 3 3, Fig. 1. Fig. 4 is a transverse section on line 4 4, Fig. 1.

The drying of the air is preferably done by means of subdivided dry calcium chlorid, as $a$; but I may use any material that will deprive the air of its moisture. I place the drying material in a cylinder $b$ between two perforated false bottoms or tube sheets $c$, in which several open tubes $d$ are fitted, through which atmospheric air or any other cooling agent can pass in order to cool the mass and the drying air, such circulating air being admitted to said tubes through perforations 10 of the cylinder and be discharged externally of the apparatus for removing therefrom the heat taken up by it. The cylinder has an outlet $i$ through the top sheet $e$ and inlet $f'$ through the bottom sheet $f$, through which the air to be dried passes. In larger drying apparatus I may put in a cooler in the mass, as a coil 5, through which I may circulate cold water for cooling the air, and it may be used for drying of the mass with steam from time to time.

The atmospheric cooler consists of a jacketed cylinder $g$, made of common or corrugated metallic sheets. The jacket has an inlet $h$ at the top connected with outlet $i$ for reception of the dried air and outlet $l$ at the bottom, and circulation of air through cylinder $g$ for cooling is provided for by perforations 13 in cylinder $b$. Means for the use of water in this cooler may also be employed— a coil $m$ for circulating water inside the cylinder, which is the simplest contrivance, or water may be allowed to trickle outside the cylinder-jacket.

The spent-air cooler consists of an insulated chamber $n$, receiving the dry air to be cooled from outlet $l$ and discharging it at $o$ into the room to be cooled. It also receives the spent air from the room to be cooled at $p$ and discharges it at $q$ for return to the drier for reuse. The chamber $n$ is divided into two series of passages separated by thin partitions for the dried and spent air, respectively, whereby the intimate contact of the oppositely-flowing currents of air will cause the warm dried air to give up some of its heat to the spent cool air. On leaving this chamber the dried air passes through a wet-chamber $s$ for being saturated with moisture, and thereby further cooling the air. Water may be supplied to this chamber through the funnel 9 from time to time, said funnel having a plug to prevent escape of air. Any suitable arrangement of means may be employed for producing these oppositely-conducting passages in the spent-air cooler; but I have in the drawings represented as one means one set of passages $t$, receiving the dry air from chamber $u$ and discharging it into the wet-chamber at $v$, and another set of passages $z$, intermediate of passages $t$, receiving the spent air from chamber $w$ and discharging it into chamber $x$ and thence to the drier. The chambers $u$ and $x$ are separated from each other by partitions $y$. Chamber $w$ is separated from the wet-chamber $s$ by partition 2, and wicks 3 of absorbent material are suspended in the wet-chamber to facilitate charging the air with moisture. For circulating the air I may use a small fan 4 or other means. I may also heat the air issuing from the spent-air cooler and carry it up to the top of the drier or higher and cool it at that point, when it will descend through the system, thus creating draft. In putting up the apparatus I place the spent-air cooler with the wet vessel at the bottom and on top of it the air-cooler and finally the drier.

I may cool the air before entering the drying apparatus, thus promoting the drying process.

Gas or fire heat may be employed for drying out the moisture of the absorbing material from time to time. For using gas a combustion-chamber 6 is provided under head $f'$, with a gas-pipe 7 entering it to supply the gas through suitable burner-orifices, to which air for combustion may be supplied through inlet 8, usually closed by a plug $9^a$, which will be removed when this heat is to be used, and a discharge-opening 11 is provided for escape of the gases of combustion, with a plug 12 to close it during the regular operations of the apparatus.

Instead of air gas may be used, and where air is herein specified it is to be understood that gas is intended as well.

What I claim as my invention is—

1. The combination in refrigerating apparatus, of a chamber containing moisture-absorbing material, means to cause the air to pass through said material for being dried, a cooler for cooling the said moisture-absorbing material, and for cooling the air passing through said material, said cooler adapted for discharging the heat externally, a vessel containing means for causing absorption of moisture by the air, after being dried and cooled, and means for causing the dried and cooled air to pass through said vessel for absorbing moisture and producing cold.

2. The combination in refrigerating apparatus, of a chamber containing moisture-absorbing material, means for causing the air to pass through said material for being dried, a cooler for receiving the dried air from the drying apparatus, and which conducts the heat away from the apparatus, means for causing the dried air to pass through said cooler, a vessel receiving the air from the cooler and containing means for causing absorption of moisture by the air subsequently to the cooling, and means for causing the dried and cooled air to pass through said vessel.

3. The combination in refrigerating apparatus, of a chamber containing moisture-absorbing material, means for causing the air to pass through said material to be dried, a cooler for cooling the said moisture-absorbing material and for cooling the air passing through said material, a cooler for receiving the dried air from the drying apparatus and which conducts the heat away from the apparatus, means for causing the dried air to pass through said cooler, a vessel receiving the air from the last-mentioned cooler and containing means for causing absorption of moisture by the air subsequently to the cooling, and means for causing the dried and cooled air to pass through said vessel.

4. The combination in refrigerating apparatus, of a chamber containing moisture-absorbing material, means for causing the air to pass through said material, a cooler for the dried air, means for causing the dried air to pass through said cooler, a vessel containing means for causing absorption of moisture by the air, means for causing the dried and cooled air to pass through said vessel, and means for applying heat to the moisture-absorbing material.

5. The combination in refrigerating apparatus, of a chamber containing moisture-absorbing material, means for causing air to pass through said material, a cooler for the air, means for causing the dried air to pass through said cooler, a vessel containing means for causing absorption of moisture by the air, means for causing the dried and cooled air to pass through said vessel, and means for discharging the spent air of the cooled room through the cooler for cooling the dried air.

6. The combination in refrigerating apparatus, of a chamber containing moisture-absorbing material, means for causing the air to pass through said material, a cooler for the air, means for causing the dried air to pass through said cooler, a vessel containing means for causing absorption of moisture by the air, means for causing the dried and cooled air to pass through said vessel, means for discharging the spent air of the cooled room through the cooler for cooling the dried air, and means for returning the spent air to the chamber containing the moisture-absorbing material.

7. The combination in refrigerating apparatus, of a chamber containing moisture-absorbing material, means for causing air to pass through said material, a cooler for said material, a cooler for the dried air, means for causing the dried air to pass through said cooler, a vessel containing means for causing absorption of moisture by the air, means for causing the dried and cooled air to pass through said vessel, and means for applying heat to the moisture-absorbing material.

Signed at New York city this 5th day of July, 1900.

JEAN V. SKOGLUND.

Witnesses:
C. SEDGWICK,
J. M. HOWARD.